United States Patent
Bösterling et al.

(10) Patent No.: US 10,774,477 B2
(45) Date of Patent: *Sep. 15, 2020

(54) METHOD FOR PRODUCING A SLEEPER FOR USE IN THE RAILWAY TRACK SUPERSTRUCTURE

(71) Applicant: Vossloh-Werke GmbH, Werdohl (DE)

(72) Inventors: Winfried Bösterling, Neuenrade (DE); Adrian Bednarczyk, Luedenscheid (DE); Nicolas Schröder, Dortmund (DE)

(73) Assignee: Vossloh-Werke GmbH, Werdohl (DE)

(*) Notice: Subject to any disclaimer, the term of this patent is extended or adjusted under 35 U.S.C. 154(b) by 0 days.

This patent is subject to a terminal disclaimer.

(21) Appl. No.: 16/094,335

(22) PCT Filed: Apr. 22, 2016

(86) PCT No.: PCT/EP2016/059064
§ 371 (c)(1),
(2) Date: Oct. 17, 2018

(87) PCT Pub. No.: WO2017/182096
PCT Pub. Date: Oct. 26, 2017

(65) Prior Publication Data
US 2019/0119859 A1    Apr. 25, 2019

(51) Int. Cl.
| | | |
|---|---|---|
| *B29C 43/00* | (2006.01) | |
| *E01B 3/44* | (2006.01) | |
| *C04B 26/04* | (2006.01) | |
| *C04B 14/06* | (2006.01) | |
| *B29C 43/02* | (2006.01) | |
| *B29C 43/52* | (2006.01) | |
| *B29K 509/00* | (2006.01) | |
| *B29L 31/06* | (2006.01) | |

(52) U.S. Cl.
CPC .............. *E01B 3/44* (2013.01); *B29C 43/003* (2013.01); *B29C 43/02* (2013.01); *B29C 43/52* (2013.01); *C04B 14/06* (2013.01); *C04B 26/045* (2013.01); *B29K 2509/00* (2013.01); *B29L 2031/06* (2013.01)

(58) Field of Classification Search
None
See application file for complete search history.

(56) References Cited

U.S. PATENT DOCUMENTS

| | | | |
|---|---|---|---|
| 5,055,350 A | 10/1991 | Neefe | |
| 5,676,895 A | 10/1997 | Toivola et al. | |
| 7,345,107 B2 | 3/2008 | Manes et al. | |
| 2003/0049428 A1* | 3/2003 | Ryan | B27N 3/04 428/292.1 |
| 2006/0024453 A1* | 2/2006 | Setser | B29B 17/0042 428/2 |
| 2015/0330031 A1* | 11/2015 | Van Erp | B32B 7/02 238/115 |

FOREIGN PATENT DOCUMENTS

| | | |
|---|---|---|
| DE | 202011050077 U1 | 9/2011 |
| EP | 1299321 B1 | 4/2003 |
| GB | 2291419 A | 1/1996 |
| WO | 9427800 A1 | 12/1994 |

OTHER PUBLICATIONS

Reade, Mohs' Hardness (Typical) of Abrasives, Apr. 16 2016. (Year: 2016).*
Kamran Nemati, Aggregates for Concrete, 2015, University of Washington, p. 3. (Year: 2015).*

* cited by examiner

*Primary Examiner* — Jeffrey M Wollschlager
*Assistant Examiner* — Armand Melendez
(74) *Attorney, Agent, or Firm* — The Webb Law Firm

(57) ABSTRACT

The invention relates to a method which enables sleepers to be produced for the railway track superstructure having optimised performance characteristics, in a reliable and cost-effective manner. The method according to the invention provides the following production steps: a) providing a mixture 10-60 % mass of which consists of a granulate of a plastic, which is deformable by applying heat, and the remainder of which consists of a sand having a bulk density of 1.4-2.0 g/cm$^3$; b) heating the mixture to a temperature of 150-200° C.; c) pouring the mixture into a press mould reproducing the sleeper; d) pressing the mixture in the mould at a pressing pressure measured in the mixture of 1-5 MPa over a pressing period of up to 60 minutes; and e) removing the sleeper from the mould.

15 Claims, No Drawings

METHOD FOR PRODUCING A SLEEPER FOR USE IN THE RAILWAY TRACK SUPERSTRUCTURE

CROSS-REFERENCE TO RELATED APPLICATION

This application is the United States national phase of International Application No. PCT/EP2016/059064 filed Apr. 22, 2016, the disclosure of which is hereby incorporated in its entirety by reference.

BACKGROUND OF THE INVENTION

Field of the Invention

The invention relates to a method for producing a sleeper provided for use in the railway track superstructure and formed from a plastic-sand mixture.

When norms or comparable regulations are referred to in this text, the version applicable at the time the present application was submitted is always meant by that, unless something else is expressly indicated.

Description of Related Art

The railway track travelled over by rail vehicles is part of the railway track superstructure and comprises rails, on which the wheels of the rail vehicle roll, sleepers, which support the rails and hold them in their correct position, and rail fastening means, by means of which the rails are fastened to the sleepers. The sleepers are usually supported on a ballast bed ("ballast bed superstructure") or on a solid foundation ("solid track") which is, for example, formed by concrete slabs or suchlike.

The sleepers are subjected to high loads in use. They not only have to absorb the weight of the rails and of the rail vehicle, but also have to absorb high, dynamic loads when a rail vehicle travels over them. At the same time, they have to endure rough and widely varying environmental conditions which are characterised, for example, by large fluctuations in temperature or humidity.

Conventional sleepers consist of wood, steel or concrete. Wooden sleepers are comparably expensive, but behave elastically to a certain extent in use. This has the advantage that without greater effort rail fastenings can be formed with them which show a certain give in the direction of gravity, which is advantageous for the durability of the rail. On the other hand, elaborate, and from the environmental point of view to some extent questionable, measures are required in order to protect wooden sleepers from rotting. Wooden sleepers must also be inspected and maintained at comparably short intervals due to the risk of rotting.

In contrast, concrete sleepers are more wear-resistant and can be produced more cost-effectively. However, they are heavy in weight and are not elastic. The lack of elasticity means that additional measures are required in order to achieve the required give at the respective rail fastening point. Concrete sleepers also prove susceptible to rapidly progressing ageing in the case of extreme changes in the weather conditions.

Sleepers which consist of a plastic-sand mixture have been proposed (DE 20 2011 050 077 U1) as an alternative to the conventional wooden or concrete sleepers. The sand and the polymers of the plastic are to be joined together in such a way that, on the one hand, a sufficient dimensional stability and, on the other hand, also an elasticity comparable with the behaviour of the wooden sleeper are achieved. A method which is to enable such sleepers to be produced is known from EP 1 299 321 B1. With this method, the sand is heated to 300-800° C. and then mixed with a granulate of the respective plastic. The mixture is put into a mould reproducing the sleeper and cooled down to 60-100° C. at a pressure of 1-40 kPa. The grain size of the sand should be 0.5-0.9 mm.

SUMMARY OF THE INVENTION

Against the background of the prior art, the object has arisen of specifying a method, by means of which sleepers can be produced which have optimised performance characteristics in a way which is cost-effective and reliable in terms of the process.

Advantageous embodiments of the invention are specified in the dependent claims and, like the general concept of the invention, are explained in detail below.

DESCRIPTION OF THE INVENTION

The method according to the invention for producing a sleeper for use in the railway superstructure comprises the following production steps:
a) providing a mixture 10-60% mass of which consists of a granulate of a plastic, which is deformable by applying heat, and the remainder of which consists of a sand having a bulk density of 1.4-2.0 $g/cm^3$;
b) heating the mixture to a temperature of 150-180° C.;
c) pouring the mixture into a press mould reproducing the sleeper;
d) pressing the mixture in the mould at a pressing pressure measured in the mixture of 1-5 MPa over a pressing period of up to 60 minutes;
e) removing the sleeper from the mould.

The invention starts from the recognition that for production to be dependable and operationally reliable it is necessary to select a precisely limited temperature range and a likewise precisely determined range for the pressing pressure, under which the sand-plastic mixture filled into the respective mould is held, until the bonding of the sand and the plastic required for the form stability of the sleeper has taken place.

The temperature range, within which the temperature of the sand-plastic mixture lies when it is being pressed in the respective mould, is 150-200° C. according to the invention. The sand-plastic mixture can obtain this temperature by initially mixing the sand and the respective plastic granulate and then heating the obtained mixture to the pressing temperature. In practical tests it has become apparent that sleepers which in terms of their contour accuracy, surface condition and mechanical properties also meet the highest requirements can be reliably produced at pressing temperatures of at least 160° C. From the point of view of optimising the use of energy, it can be advantageous to limit the pressing temperature to at most 180° C.

As an alternative to heating the plastic and the sand together, it can be advantageous to just pre-heat the sand and only then mix it with the plastic granulate which has still not been heated. As a result of the contact with the hot sand, the plastic which up to that point is cooler is quickly heated up to the pressing temperature required according to the invention. This not only has advantages for the effective use of the thermal energy, but also has a positive effect on the process of bonding the sand and plastic. In order to utilise these advantages, the sand, taking into account the mass ratios of the sand and the plastic provided in the sleeper to be produced as well as the heating behaviour of the plastic, has to be heated beyond the pressing temperature such that the temperature of the mixture formed from the hot sand and the cool plastic after mixing lies in the temperature range provided according to the invention. To that end, it has proved successful in practical tests if the sand is heated to a temperature of 180-250° C., in particular at least 190° C. or at most 230° C., and then mixed with the plastic.

The sand-plastic mixture processed according to the invention must have the pressing temperature specified according to the invention in the press mould. In order to ensure that this is the case, it can be necessary, in the case of variants of the method in which the sand-plastic mixture is heated before being poured into the mould and is filled in the hot state into the shaping die, to set the temperature of the sand-plastic mixture, taking into account the temperature loss which can occur by contact of the mixture with the mould, such that the temperature of the mixture after it has been poured into the mould still lies in the temperature range specified for the pressing temperature. In order to prevent excessive temperature loss, it can be advantageous to bring the press mould to a temperature of at least 100° C. on average, in particular at least 110° C., for the pouring-in operation, wherein temperatures of up to 180° C., in particular up to 140° C., have in practice proved sufficient here and have proved favourable from the point of view of the optimum use of energy, in order to ensure a sufficient control of temperature of the sand-plastic mixture filled into the press mould in each case. Here, "on average" means in connection with the temperature of the press mould that the average of the temperature detected for all areas of the press mould corresponds to the specifications according to the invention. Hence, there can locally be deviations from these specifications, i.e. higher or lower temperatures. What matters is that the average value is obtained, wherein the locally occurring deviations from the average value are optimally not more than 10%, in particular not more than 5%.

The sleeper can be removed from the mould after pressing. It is self-evident that the sleeper is cooled, as required, in the mould down to a certain removal temperature, in order to make removal from the mould easier. Thus, it has proved advantageous if the removal temperature of the sleeper is 40-100° C., in particular 50-70° C.

It is also essential for the success of the invention that the sand mixed with the plastic granulate has a bulk density of 1.4-2.0 g/cm$^3$, wherein sands having a bulk density of at least 1.6 g/cm$^3$ have proved to be particularly advantageous. With sands having a bulk density chosen within the specifications according to the invention, it is ensured that the sand mixes well with the plastic granulate and consequently that the sand grains bond well to the plastic matrix which surrounds them in the completed sleeper and is formed from the plastic granulate grains fusing and compressed in the course of the heating and pressing process. Bulk densities of up to 1.9 g/cm$^3$, in particular at least 1.7 g/cm$^3$, have proved to be particularly advantageous.

Practical tests have shown that sand which consists of grains having an average grain size of 0.6-6 mm, in particular up to 5 mm, is particularly well suited for the purposes according to the invention. Thus, with such a grain size the sand grains are embedded particularly well into the plastic matrix of the completed sleeper. Not only the stability of the sleeper is hereby optimised, but also its damping behaviour and its elasticity are set in an optimum manner for use as a sleeper in a railway track for rail vehicles. Sands whose grains have an average diameter of at least 0.8 mm, in particular 1.0 mm or more than 1.0 mm, have proved to be particularly advantageous, wherein sands having average grain diameters of at most 1.6 mm have particularly proved themselves in tests.

All sands whose bulk density as a minimum requirement corresponds to the specifications according to the invention are eligible as sands for the purposes according to the invention.

Crushed sands have proved to be particularly advantageous. Here, these are usually artificially produced sands, as formed, for example, when recycling products produced based on sand, such as sleepers according to the invention. Crushed sands are characterised by the fact that their grains have sharp-edged protrusions on their circumference, by means of which they hook themselves onto the grains adjacent to them and thus contribute to the sleeper produced according to the invention having a particularly high strength and resistance to rupture.

The hardness of the grains of the sand used according to the invention advantageously has a hardness of 5-8 determined according to Mohs (see, by way of example, Detlef Gysau, "Füllstoffe" (Fillers), 3$^{rd}$ Edition, Hanover: Vincentz Network, 2014, ISBN: 9783866308398), wherein sands with grains which have a hardness determined according to Mohs of at least 6, in particular at least 7, have proved to be particularly suitable.

The content of the mixture of plastic granulate provided for the method according to the invention in production step a) is 10-60% mass, wherein contents of 20-40% mass have proved to be particularly advantageous.

In principle, all plastics which can be mixed with a sand constituted according to the specifications according to the invention and can be compressed by applying heat and pressure such that there is sufficient bonding between the plastic and the grains of sand embedded in it, can be used as the plastic for the production of a sleeper according to the invention. The plastics usually referred to as "thermoplastic" are particularly suitable for this purpose.

Plastic granulates which consist of a polypropylene granulate (PP granulate) or a polyethylene granulate (PE granulate), in particular a granulate consisting of a high density polyethylene (HDPE granulate), are particularly suitable here. These granulates can be used consisting of just one plastic granulate alone or can be used as a mixture of different plastic granulates. In the case where such a plastic mixture is to be used, it has proved to be advantageous if the plastic granulate consists of 40-60% mass of PP granulate and the remainder consists of PE or HDPE granulate.

With regard to filling the mould well when pressing the sand-plastic mixture filled into the shaping mould according to the invention, it has also proved to be advantageous if the melt flow MFI/190/2.16, determined according to DIN EN ISO 1133 at a test temperature of 190° C. and a load mass of 2.16 kg (see also: A. B. Mathur, I. S. Bhardway, "Testing and Evaluation of Plastics", Allied Publishers PVT. Limited, 2003, ISBN 81-7764-436-X), of the plastic or of the plastics of which the plastic granulate consists is in each case less than 10, in particular less than 9. When using PP granulate its melt flow index MFI/190/2.16 can be less than 10 and when using PE granulate, in particular HDPE granulate, its melt flow index can be less than 8, in particular less than 5.

Good intermixing of the plastic material with the sand of the sand-plastic mixture processed according to the invention can be additionally supported by adapting the grain size of the granulate to the grain size of the sand. It has proved successful if the plastic granulate is pulverulent or powdery for this purpose.

Sleepers produced according to the invention have a high resistance to rupture.

Tests carried out according to DIN EN 13146-10 have shown consistently high pull-out resistances for the sleepers produced according to the invention which meet the strictest requirements, so that the requirements set in practice in this regard are always reliably met.

In addition, sleepers according to the invention prove to be suitable to a special degree for the use of self-tapping rail fastening screws which for fastening the rail to be supported on the sleeper in each case are screwed into a cylinder opening inserted into the sleeper, in particular as a drill hole, and in the process cut into the material surrounding the opening. Here, it has been shown that sleepers according to the invention can absorb high tightening torques of at least 60 kN without sleeper material chipping. In combination with sleepers according to the invention this allows simply constructed and inexpensive systems to be used for fastening the respective rail to be fastened, in which only a minimum number of screws are required for anchoring it to the sleeper.

The invention is explained in more detail below by means of an exemplary embodiment.

A crushed quartz sand was provided for producing a sleeper, formed in a conventional way in a rectangularly elongated manner, for a ballast bed superstructure. The bulk density of the sand was approximately 1.9 g/cm$^3$ with a hardness of 7 determined according to Mohs and an average grain size of the sand grains of 1.0-1.6 mm.

Equally, a plastic granulate was provided which consisted of a mixture of PP plastic granules and HDPE plastic granules. The PP plastic granules and the HDPE plastic granules were contained in a ratio of 1:1 in the mixture. The melt flow index of the PP plastic granulate determined at 190° C. and with a load of 2.16 kg was 8, whereas in the case of the HDPE plastic granulate it was 3. The plastic granulate was also present as granulate.

Before being mixed with the plastic granulate the sand was heated to 220° C. by means of a heating cartridge immersed in it and heated by a heated oil. The temperature of the plastic granulate, on the other hand, corresponded to room temperature.

The hot sand was then mixed with the plastic granulate. The metering of the sand and the plastic granulate was effected such that the obtained sand-plastic mixture consisted of 30% mass of plastic granulate (15% mass of PP plastic granulate and 15% mass of HDPE plastic granulate respectively) and the rest of sand. In the course of mixing, the plastic granulate was heated and the hot sand was correspondingly cooled, so that the obtained sand-plastic mixture had a pressing temperature of 170° C. At this temperature, the plastic granulate was already fully fused.

The sand-plastic mixture brought to the correct temperature in this way was filled into a mould of a pressing tool, the temperature of which was held at at least 120° C.

Then, the sand-plastic mixture was held in the mould for a period of, for example, 30 minutes under a pressure of 3.6 MPa. In this way, the mould was uniformly filled with the sand-plastic mixture, so that the details of the sleeper specified by the mould were reproduced perfectly and intensive bonding of the sand to the plastic surrounding it occurred.

After the end of the moulding time, the mould was opened and the sleeper obtained was cooled down to a demoulding temperature of 60° C., at which the sleeper was finally removed from the mould.

The sleeper obtained had such a high break resistance that it could reliably absorb the loads occurring in practical use in an enduring manner.

At the same time, the pull-out resistances, i.e. the forces required to pull the anchoring of a rail fastening out of the sleeper, have proved to be considerably greater than the minimum value stipulated for this purpose in practice.

Equally, in tests with conventional sleeper screws tightening torques were obtained which were considerably above 60 kN, for example 70 kN and more.

The invention claimed is:

1. A method for producing a sleeper for use in the railway track superstructure, comprising: a) Mixing a granulate of a plastic, which is deformable by applying heat, with a sand having a bulk density of 1.4-2.0 g/cm$^3$, wherein 10-60% mass of a resulting mixture consists of the granulate of a plastic and the remainder of the mixture consists of the sand, the plastic granulate comprises a polypropylene or a polyethylene or a mixture of a polypropylene and a polyethylene; b) heating the mixture to a temperature of 150-200° C.; c) pouring the mixture into a press mould reproducing the sleeper; d) pressing the mixture in the mould at a pressing pressure measured in the mixture of 1-5 MPa over a pressing period of up to 60 minutes and e) removing the sleeper from the mould.

2. The method according to claim 1, wherein the mass provided in production step a) contains 20-40% mass of the granulate of a plastic.

3. The method according to claim 1, wherein the bulk density of the sand provided in production step a) amounts to at least 1.6 g/cm$^3$.

4. The method according to claim 1, wherein the pressing period is at least 5 minutes.

5. The method according to claim 1, wherein the temperature which the mixture is heated to in production step b) is at least 160° C.

6. The method according to claim 1, wherein the plastic granulate consists of a polypropylene granulate (PP granulate) or a polyethylene granulate (PE granulate).

7. The method according to claim 1, wherein the plastic granulate is mixed from a PP granulate and a PE granulate.

8. The method according to claim 7, wherein 40-60% mass of the plastic granulate consists of PP granulate and the remainder consists of PE granulate.

9. The method according to claim 1, wherein the melt flow index MFI/190/2.16 of the plastic or of the plastics of which the plastic granulate consists is less than 10 in each case.

10. The method according to claim 1, wherein the sand is heated to a temperature of 150-230° C. before it is mixed with the plastic granulate.

11. The method according to claim 1, wherein the temperature of the press mould is on average 100-140° C. when being filled with the plastic granulate-sand mixture.

12. The method according to claim 1, wherein the sand consists of grains having an average grain size of 0.6-6 mm.

13. The method according to claim 12, wherein the grains of the sand have a grain size of 0.8-1.6 mm.

14. The method according to claim 1, wherein the sand has a hardness of 5-8 determined according to Mohs.

15. The method according to claim 1, wherein the sand is crushed sand.

* * * * *